United States Statutory Invention Registration [19]

[11] Reg. Number: H313

Staudenmann et al. [43] Published: Jul. 7, 1987

[54] MONOCHROMATOR FOR CONTINUOUS SPECTRUM X-RAY RADIATION

[75] Inventors: Jean-Louis Staudenmann, Ames, Iowa; Gerald L. Liedl, West Lafayette, Ind.

[73] Assignee: The United States of America as represented by the United States Department of Energy, Washington, D.C.

[21] Appl. No.: 854,708

[22] Filed: Apr. 23, 1986

Related U.S. Application Data

[63] Continuation of Ser. No. 557,517, Dec. 2, 1983.

[51] Int. Cl.[4] ..... G01N 23/20; G21K 1/06; G01J 1/00

[52] U.S. Cl. ..... 378/81; 378/85; 250/503.1

[56] References Cited

U.S. PATENT DOCUMENTS 3,564,240 2/1971 Thomas, Jr. ..... 378/81
4,365,156 12/1982 Golovchenko et al. ..... 378/84

FOREIGN PATENT DOCUMENTS 0817553 3/1981 U.S.S.R. ..... 378/73

OTHER PUBLICATIONS

J. H. Beaumont et al, Journal of Physics, E7, (1974), 823.
U. Bonse et al, Journal of Applied Crystallography, 9, (1976), 223.
W. Bauspiess et al, Journal of Applied Crystallography, 10, (1977), 338.
M. Hart et al, Journal of Applied Crystallography, 11, (1978), 248.
L. D. Calvert et al, Acta Crystallography, A32 (1976), 648.
M. Hart, Reports in Progress of Physics, 34, (1971), 435.
J. A. Golovchenko et al, Rev. Sci. Instrum., 52(4) Apr. 1981, "X-ray Monochromator System for use with Synchrotron Radiation Sources", pp. 509–516.
R. W. James, *The Optical Principles of the Diffraction of X-rays*, 1965, Cornell University Press, Ithaca, New York, pp. 304–318.
J. W. M. DuMond, Physical Review, 52 (1937), 872.
J. Witz, Acta Crystallographica, A25, (1969), 30.
J. B. Hastings, Journal of Applied Physics, 48 (1977) 1576.

*Primary Examiner*—Stephen C. Buczinski
*Assistant Examiner*—Linda J. Wallace
*Attorney, Agent, or Firm*—Michael J. Higgins; John M. Albrecht; Judson R. Hightower

[57] ABSTRACT

A monochromator for use with synchrotron x-ray radiation comprises two diffraction means which can be rotated independently and independent means for translationally moving one diffraction means with respect to the other. The independence of the rotational and translational motions allows Bragg angles from 3.5° to 86.5°, and facilitates precise and high-resolution monochromatization over a wide energy range. The diffraction means are removably mounted so as to be readily interchangeable, which allows the monochromator to be used for both non-dispersive and low dispersive work.

10 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MONOCHROMATOR FOR CONTINUOUS SPECTRUM X-RAY RADIATION

CONTRACTUAL ORIGIN OF THE INVENTION

The United States Government has rights in this invention pursuant to the Contract No. W-7405-ENG-82 between the U.S. Department of Energy and Iowa State University.

This is a continuation of U.S. patent application Ser. No. 557,517 filed Dec. 2, 1983.

BACKGROUND OF THE INVENTION

This invention relates to a monochromator for a beam of photons having a wide energy range. More particularly, this invention relates to a monochromator for continuous spectrum x-ray radiation, such as Bremsstrahlung radiation and especially synchrotron radiation.

In recent years, synchrotron radiation has been developed as a source of x-rays for experimental use. Synchrotron radiation offers many features which are of interest in x-ray experimentation. The radiation has a continuous wavelength spectrum which, depending on the maximum energy of the orbiting electrons, may well extend from 0.1Å x-rays to visible light. Synchrotron radiation has a high flux, is highly collimated, and the radiation emitted in the orbital plane may be polarized up to 100%.

Various combinations of these features may be required for different types of x-ray experiments. For example, a beam of high flux and low energy resolution may be adequate for diffuse scattering measurements, while inelastic scattering experiments might require higher energy resolution. Absorption measurements such as those performed in extended X-ray absorption fine-structure measurements could have still further requirements. In addition, the availability of synchrotron radiation could make new experiments and applications of x-rays feasible for the first time. These new applications could impose still further requirements.

These different requirements must be met by the optical design of the synchrotron beam line. In particular, the monochromator has a major role in this context. Unlike conventional x-ray machines which used characteristic lines and, therefore present minimal problems of monochromatization, the continuous spectrum of synchrotron radiation or that of the Bremsstrahlung presents the problem of monochromatization if the experiment requires only one precisely known wavelength, or if the wavelength used must be known precisely as it is varied as a function of time. A monochromator for synchrotron radiation should be adaptable to a variety of conditions.

It is known that double monochromators, that is, monochromators having two diffracting crystals operating in tandem, offer improved resolution of x-ray beams. The theory of double monochromators is set forth by R. W. James, *The Optical Principles of the Diffraction of X- Rays,* 1965, Cornell University Press, Ithaca, New York, pp. 304–318, and by J. W. M. DuMond, Physical Review, 52, (1937), 872. Much of the effort in designing early double monochromators was based on this theory. In particular, focusing monochromators are reviewed by J. Witz, Acta Crystallographica, A25, (1969), 30.

More recently double monochromators have been applied to the unique characteristics of synchrotron x-rays. The optics of focusing and non-focusing monochromators for synchrotron radiation has been reviewed by J. B. Hastings, Journal of Applied Physics, 48, (1977) 1576. Multiple Bragg reflection monochromators for synchrotron radiation have been described by J. H. Beaumont and M. Hart in the Journal of Physics, E7, (1974), 823. In these monochromators each crystal is cut into a pair of reflectors to provide multiple reflection. Each pair of reflectors must be cut from one monolithic perfect crystal to ensure that their relative orientation is correct. This type of monochromator generally does not eliminate higher harmonics.

Several types of perfect crystal monochromators for use with synchrotron radiation have been reviewed by U. Bonse, G. Materlik, and W. Schroder in Journal of Applied Crystallography, 9, (1976), 223. These monochromators utilized the multiple reflection groove crystal alone and in combination with other perfect crystals. It is shown that higher harmonics can be eliminated if the monochromator system is dispersive, that is if two different types of crystals are used simultaneously.

In other monochromators the two crystals are mounted in a device known as a Thompson bearing. This device rotates the two crystals in tandem and also controls translational movement of the crystals with respect to one another. By rotating and translationally moving the crystals the monochromator can achieve a range of Bragg angles so that the radiation having the range of corresponding wavelengths can be monochromatized. The Bragg angles available with the Thompson bearing generally range from about 6°–60° to about 45°–60° which corresponds to a maximum energy of about 25 keV. The bearing is designed so that the translational and rotational movements of the crystals are all interdependent and operated by a single motor. The machinery of the device must be extremely accurate to maintain parallelism between the crystals. In addition, the crystals must be very carefully and precisely mounted in the bearing.

All the prior art monochromators discussed are advantageous for particular types of experiments, yet no one monochromator has sufficient flexibility to accommodate different experiments having widely disparate requirements. For example, a monochromator suitable for non-dispersive work could not provide a low dispersive beam. Similarly, a monochromator designed for low energy experiments could not provide high energy output. It would be desirable to have a single monochromator which would be adaptable to a variety of experimental conditions.

SUMMARY OF THE INVENTION

It is thus one object of the invention to provide a monochromator for continuous spectrum x-ray radiation.

It is another object of the invention to provide a monochromator for synchrotron x-ray radiation which can monochromatize a beam of x-rays having a wide energy range.

It is yet another object of the invention to provide a monochromator for synchrotron x-ray radiation which can monochromatize a beam of x-rays both non-dispersively and with low dispersion.

It is still another object of the invention to provide a monochromator for synchrotron x-ray radiation which can provide high energy resolution.

Additional objects, advantages and novel features of the invention will be set forth in part in the following description.

In accordance with the invention, a monochromator is provided having two diffraction means, separate means for independently rotating each diffraction means, and means for translationally moving one diffraction means with respect to the other, said translational movement also being independent of the rotational movement of the two diffraction means. The independent operation of the two rotational motion means and the translational motion means facilitates the monochromatization of a beam of photons having a wide energy range. This is because the independent motion allows the diffraction means to be positioned to accept a wide range of Bragg angles, the Bragg angle being a function of the energy of the incident radiation. The monochromator of the instant invention will allow a Bragg angle range from 3.5° to 86.5°.

The two rotational motion means and the translational motion means are driven by three independent motors which are computer controlled. The crystals are thereby repositioned by very small and precisely known increments. This allows the beam to be monochromatized with both high resolution and high precision.

The diffraction means for x-ray radiation are crystals mounted on crystal holders which are mounted on the respective rotational motion means. The crystal holders may be cylindrical crystal benders, which facilitate focusing of the beam. The crystal holders are designed to be easily dismounted from the rotational motion means, which facilitates changing the crystals. Thus the monochromator may be readily changed from non-dispersive operation, in which the two crystals are of the same type, to low-dispersive operation, in which the two crystals are of different types. Low-dispersion operation is particularly advantageous in those experiments which require elimination of high-order harmonics.

DETAILED DESCRIPTION OF THE INVENTION

The following is a detailed description of a preferred embodiment of the invention; other embodiments will be readily apparent to those skilled in the art.

Figure 1:
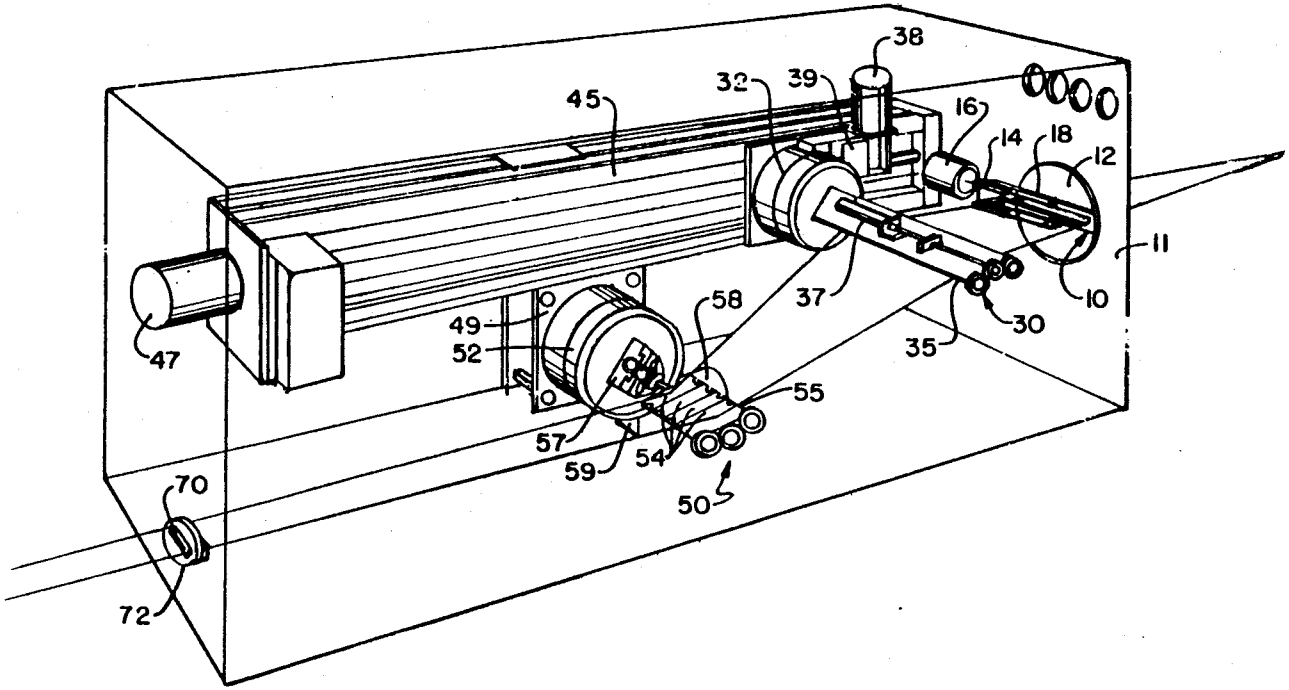
FIG. 1 is a perspective view of the monochromator of the instant invention.

FIG. 1 illustrates a preferred embodiment of the invention. Radiation emanating from a synchrotron (not shown) enters the monochromator through window 10, and is diffracted from first diffraction means 30 and second diffraction means 50 before exiting as a monochromatized beam from window 70. The diffraction means 30 and 50 are mounted on rotating tables 32 and 52, respectively. Rotating table 32 is mounted on motorized slide means 45. Rotating table 52 is shown in a fixed position, but it is understood that it may be laterally moved to meet different experimental requirements.

The wavelength of the diffracted radiation is a function of the angle of diffraction, as stated in the well-known Bragg relation $$n\lambda = 2d \sin \theta$$

where n is the order of the harmonic, $\lambda$ is the wavelength of the diffracted radiation, d is the spacing between atomic planes of the diffracting crystal, and $\theta$ is the angle of diffraction, also known as the Bragg angle.

In order to achieve a wide range of Bragg angles, it is necessary to have a relative long slide means 45 and a relatively short distance between diffraction means 50 and the axis of slide means 45. Thus it may be seen that when diffraction means 30 is nearer to window 10 and diffraction means 50 is nearer to window 70 then the angle of diffraction will be smaller, and may be as small as 3.5°, and when diffraction means 30 is nearer to window 70 and diffraction means 50 is nearer to window 10, then the angle of diffraction will be larger, and may be as large as 86.5°. Because the monochromator allows such a wide range of diffraction angles, otherwise known as Bragg angles, it can monochromatize x-ray radiation over a wide energy range.

Incident radiation enters the system through window 10. The window is preferably made of beryllium and is water cooled. The beryllium absorbs a substantial part of the low energy portion of the radiation spectrum emitted from the synchrotron, which reduces the thermal energy entering the monochromator. The window is mounted in brass plug 12 which is mounted in monochromator housing 11. This arrangement facilitates repair and replacement of the window when necessary. Entrance window 10 is typically $101.6 \times 10 \times 0.254$ mm. This shape readily accommodates synchrotron radiation, which is generally emitted as a flat, elongated, highly polarized beam.

Adjacent to window 10 is a member 14 having an adjustable slit, which is used to control the flux of the x-rays passing through the monochromator. The slit member 14 is constructed of solid tantalum and is about 6 mm thick. The slit member 14 is driven by motor 16 and slides along water cooled brass assembly 18. Slit member 14 opens symmetrically; only one half of slit member 14 is shown in the figure. The flux thus may be adjusted as required for experimental conditions, or as required for operator safety After passing through window 10, the beam of x-rays encounters first diffraction means 30. Most of the beam will not be affected by first diffraction means 30 and will continue in a straight path. However, that portion of the beam having a wavelength of about $\lambda$ related by the Bragg equation to the diffraction angle $\theta$ at which first diffraction means 30 is set will be diffracted thereby to second diffraction means 50. Again, part of the diffracted beam will not be affected by second diffraction means 50 and will travel through it in a straight path while that portion of the diffracted beam having a wavelength of about $\lambda$ corresponding to the Bragg angle $\theta$ at which second diffraction means 50 is set will be diffracted thereby to exit window 70.

Figure 2:
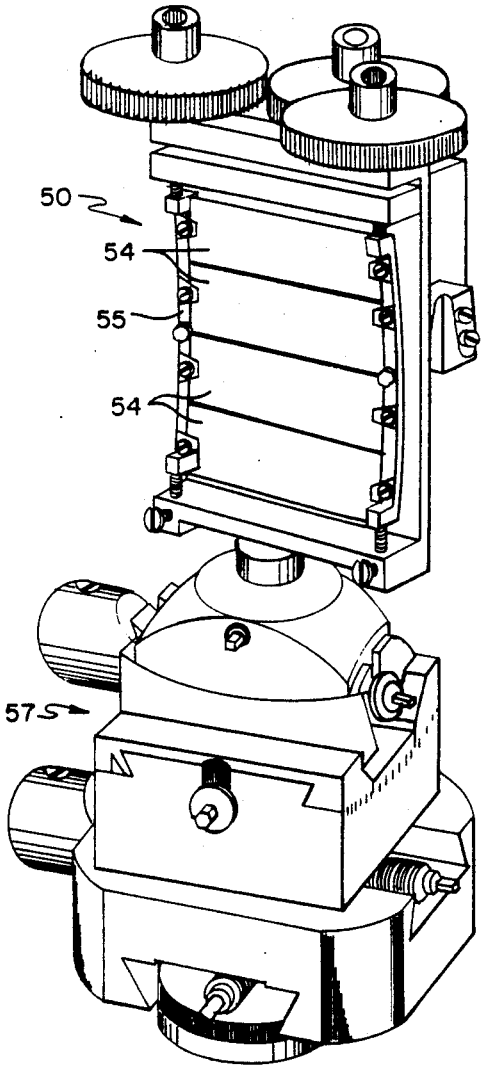
FIG. 2 illustrates a crystal holding apparatus of the monochromator.

Second diffraction means 50 is shown in greater detail in FIG. 2. It is understood that the design of first diffraction means 30 is very similar to that of second diffraction means 50 and that second diffraction means 50 is chosen and described merely by way of example.

As shown in FIG. 2, diffraction means 50 includes crystals 54 which are mounted on crystal holder 55. Holder 55 is preferably a crystal bender which positions the crystal surfaces relative to one another such that the combined surfaces approximate a portion of a cylindrical surface. The cylindrical shape facilitates focussing of the x-ray beam, which causes the beam to become more narrow and concentrated Referring to FIG. 1, first diffraction means 30 including crystal bender 35 is positioned with the crystals face downward and not visible to the viewer. Nonetheless it is apparent that the structure of first diffraction means 30 is analogous to the structure of second diffraction means 50, except that the first diffraction means 30 is substantially longer than second diffraction means 50. The extra length accommodates the horizontal divergence of the beam that occurs after the beam passes through window 10, and helps focus the beam onto second diffraction means 50.

Crystal holders 35 and 55 are mounted on goniometer heads 37 and 57, respectively. The goniometer heads each have two±15° arcs. Goniometer head 57 also has ±10 mm translations, one of which is provided with a feedback device to control the beam exit position. The motions of the arcs and the translations are controlled by DC motors. The arcs and translations allow for alignment of the two diffraction means 30 and 50. Crystal holders 35 and 55 are designed to be easily mounted on and removed from goniometer heads 37 and 57. This facilitates interchanging of the crystal devices, which increases the flexibility of the monochromator. Imperfections in orientation which arise from interchanging the crystal holders are easily corrected by use of the goniometer arcs and translations.

Goniometer heads 37 and 57 are mounted on rotating tables 32 and 52 respectively, which provide the Bragg angle motion for the monochromator. The motions are controlled through DC stepping motors 38 and 58 and gear reducers 39 and 59, respectively. The stepping motors and gear reducers provide 1600 increments/degree, so that tables 32 and 52 may be rotated very precisely and accurately, yet independently of each other.

Rotating table 32 is mounted on slide means 45. The translational motion of rotating table 32 along slide means 45 is controlled by DC stepping motor 47 which provides 5 μm increments along the 1220 mm slide means 45.

Rotating table 52 is mounted on support means 49 which in turn is mounted directly to housing 11. Rotating table 52 is positioned 140 mm below slide means 45 and can be manually repositioned at 50 mm increments along a linear path parallel to slide means 45.

Diffraction means 50 is oriented to direct and focus the x-ray beam to exit window 70. Exit window 70 is made of beryllium and is typically 76.2×20×0.254 mm. Exit window 70 is mounted within brass plug 72 which is mounted in housing 11. As with entrance window 10 and brass plug 12, this arrangement facilitates repair and replacement of exit window 70.

Another advantage of the beryllium windows is that they allow the system to operate in a helium atmosphere. The helium atmosphere makes it simpler to incorporate components into the system, and also does not attenuate the x-rays as much as air. Furthermore, the helium atmosphere system has significant cost advantages over a hard vacuum monochromator system. The helium also allows removal of the heat generated by the motors within monochromator housing 11 by evacuation. Finally, the beryllium windows allow evacuation of beam transport tubes (not shown) which may extend from the synchrotron radiation source to window 10 and from window 70 to the sample of interest.

It may be seen that the monochromator of the instant invention offers the experimenter great control over the properties of the exit beam. The rotational and translational motions of the diffraction means allow a range of Bragg angles from 3.5° to 86.5°. For graphite monochromator crystals this corresponds to a wavelength range of about 0.25 Å to about 5 Å, and for silicon monochromator crystals this corresponds to a wavelength range of about 0.25 Å to about 6 Å. These very low wavelengths indicate that the output beam of the monochromator may have energies as high as 50–60 kV. This is a significant improvement over prior art monochromators, many of which have a maximum energy output of about 25 kV.

The experimenter also has control over the type of crystal and crystal holder used in the monochromator. The crystals may be of graphite, silicon, germanium, or other materials which diffract x-rays, each of which has various advantages and disadvantages. For example, the resolution of a beam diffracted from a graphite crystal is less than that of a beam diffracted from a silicon crystal, but the flux of the beam can be 100 times greater with the graphite crystal than with silicon. Thus the operator can choose which properties are most important for a particular experiment and select the crystals accordingly.

The operator can also choose to have the first and second crystals be of the same type to get a nondispersive beam, which would have a high resolution but would also include higher order harmonics, or the operator could elect to use two different types of crystals, for example a graphite crystal and a silicon crystal, to obtain a low-dispersive beam, which might have poorer resolution but would eliminate the higher order harmonics. The instant monochromator is unique in the way it combines the possibilities of non-dispersive and low-dispersive work at the discretion of the experimenter.

In addition, the instant invention allows the inventor to choose the means of support of the crystals. Crystal holders 35 and 55 may merely support the crystals in a plane, or they may be capable of either cylindrical or elastic bending of the crystals. Because crystal holders 35 and 55 are easily removed from goniometer heads 37 and 57, the experimenter may readily interchange crystal holders to suit particular experimental needs.

The instant invention is a highly flexible monochromator system which provides optimum operation for a wide range of needs for x-ray scattering experiments. The foregoing description of a preferred embodiment is not intended to limit the invention to the precise form disclosed. Many modifications and variations will be apparent to those skilled in the art in light of the above teaching. For example, alternative crystal materials could be used. In another embodiment, the crystals could be replaced by gratings so that the monochromator could be used with ultraviolet radiation. Changes could be made in the stated dimensions of the components without materially altering the inventive concept. Additionally, the monochromator could be used with other sources of radiation such as an x-ray rotating anode generator. The important feature of the invention is the independent rotational and translational motions of the two diffracting means, which allow great flexibility in the operation of the monochromator. The embodiment was chosen and described in order to best explain the principles of the invention and its practical application.

The embodiments of this invention in which an exclusive property or privilege is claimed are defined as follows:

1. A monochromator for a continuous spectrum beam of photons comprising:

a first diffraction means;

a second diffraction means;

a means for positioning said first and second diffraction means with respect to an incoming continuous spectrum beam of photons and with respect to each other in a plurality of sets of positions such that in each set of positions photons of a selected energy will be firstly diffracted by said first diffraction means and secondly diffracted by said second diffraction means to form a monochromated output beam generally parallel to said incoming beam and displaced therefrom by a fixed distance; said positioning means including:

a first means for rotating said first diffraction means about a first axis generally perpendicular to said incoming beam;

a second means for rotating said second diffraction means about a second axis, generally parallel to said first axis, said first and second rotating means being independent of each other;

a means for translationally moving said first diffraction means with respect to said second diffraction means along an axis coincident with said incoming beam of photons, said translating means being independent of said first and second rotating means.

2. The monochromator of claim 1 including:

a first holder means to hold said first diffraction means, a second holder means to hold said second diffraction means, wherein said first and second diffraction means are removably mounted in said first and second holders respectively.

3. The monochromator of claim 2 wherein said photons are X-rays and said first and second diffraction means comprise Bragg crystals.

4. The monochromator of claim 3 wherein said first diffraction means and said second diffraction means comprise the same material such that said monochromator is non-dispersive.

5. The monochromator of claim 3 wherein said first diffraction means and said second diffraction means do not comprise the same material such that said monochromater exhibits low dispersion.

6. The monochromator of claim 2 wherein said first and second rotating means comprise first and second rotating tables and first and second motor means to rotate said rotating tables, said first and second holders being mounted to said first and second rotating tables.

7. The monochromator of claim 6 wherein said means for translationally moving said first diffraction means comprises a slide means, means for mounting said first rotating table on said slide means, and a third motor for moving said first rotating table means along said slide means.

8. The monochromator of claim 2 wherein each of said holders is a crystal bender for bending its respective crystal to facilitate focusing of the photon beam.

9. The monochromator of claim 2 wherein each of said holders includes a goniometer for fine adjustment of the position of its respective diffraction means.

10. The monochromator of claim 3 further comprising a housing containing said first and second diffraction means, said first and second holders, said first and second rotating means and said means for translationally moving said first diffraction means;

an entrance window and an exit window mounted in said housing wherein said entrance and exit windows are made of beryllium;

means for cooling said entrance and exit windows;

an adjustable slit for moderating the flux of the incoming photon beam, mounted within said housing adjacent to said entrance window.

* * * * *